United States Patent
Fine et al.

(10) Patent No.: US 6,813,250 B1
(45) Date of Patent: *Nov. 2, 2004

(54) SHARED SPANNING TREE PROTOCOL

(75) Inventors: Michael Fine, San Francisco, CA (US); Silvano Gai, Vigliano d'Asti (IT); Keith McCloghrie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 581 days.

This patent is subject to a terminal disclaimer.

(21) Appl. No.: 09/748,534

(22) Filed: Dec. 22, 2000

Related U.S. Application Data

(63) Continuation of application No. 08/997,297, filed on Dec. 23, 1997, now Pat. No. 6,188,694.

(51) Int. Cl.[7] .............................................. H04L 12/28
(52) U.S. Cl. ........................ 370/256; 370/402; 370/397
(58) Field of Search ............................... 370/390, 397, 370/449, 389, 469, 432, 395, 400, 401, 409, 270, 396, 410, 216, 225, 238, 256, 402, 407, 408, 351

(56) References Cited

U.S. PATENT DOCUMENTS

| | | | | |
|---|---|---|---|---|
| 4,811,337 A | | 3/1989 | Hart ............................. 370/85 |
| 4,933,937 A | * | 6/1990 | Konishi ....................... 370/466 |
| 5,018,137 A | * | 5/1991 | Backes et al. ............... 370/401 |
| 5,309,437 A | * | 5/1994 | Perlman et al. ............. 370/401 |
| 5,323,394 A | * | 6/1994 | Perlman ...................... 370/401 |
| 5,394,402 A | * | 2/1995 | Ross ............................ 370/402 |
| 5,500,860 A | * | 3/1996 | Perlman et al. ............. 370/401 |
| 5,511,168 A | * | 4/1996 | Perlman et al. ............. 370/409 |
| 5,684,800 A | * | 11/1997 | Dobbins et al. ............. 370/401 |
| 5,752,003 A | * | 5/1998 | Hart ............................ 709/223 |
| 5,761,435 A | | 6/1998 | Fukuda et al. ......... 395/200.68 |
| 5,825,772 A | * | 10/1998 | Dobbins et al. ............. 370/401 |
| 5,878,232 A | * | 3/1999 | Marimuthu .................. 709/249 |
| 5,892,912 A | * | 4/1999 | Suzuki et al. ............... 370/401 |
| 5,959,989 A | * | 9/1999 | Gleeson et al. ............. 370/401 |
| 5,963,556 A | * | 10/1999 | Varghese et al. ............ 370/401 |
| 6,014,380 A | * | 1/2000 | Hendel et al. .............. 370/469 |
| 6,023,563 A | * | 2/2000 | Shani .......................... 370/401 |
| 6,032,194 A | * | 2/2000 | Gai et al. .................... 370/351 |
| 6,035,105 A | * | 3/2000 | McCloghrie et al. ....... 370/402 |
| 6,041,057 A | * | 3/2000 | Stone .......................... 370/465 |
| 6,041,358 A | * | 3/2000 | Huang et al. ............... 370/331 |
| 6,151,324 A | * | 11/2000 | Belser et al. ............... 370/409 |

\* cited by examiner

*Primary Examiner*—Duc Ho
*Assistant Examiner*—Phuongchau Ba Nguyen
(74) *Attorney, Agent, or Firm*—Cesari and McKenna, LLP

(57) ABSTRACT

A shared spanning tree protocol (SSTP) creates a plurality of spanning trees (i.e., loop-free paths) which are shared among one or more virtual local area network (VLAN) designations for data transmission within a computer network. Each shared spanning tree includes and is defined by a primary VLAN and may be associated with one or more secondary VLANs. In order to associate VLAN designation(s) with a single shared spanning tree, network devices exchange novel shared spanning tree protocol data units (SST-PDUs). Each SST-PDU corresponds to a given primary VLAN and preferably includes one or more fields which list the secondary VLAN designations associated with the given primary VLAN. The association of VLAN designations to shared spanning trees, moreover, preferably depends on which path traffic is to follow as well as the anticipated load characteristics of the various VLANs. The association of VLAN designations to shared spanning trees thus provides a degree of load balancing within the network. Data messages tagged with a particular VLAN designation are then distributed by the devices only along the shared spanning tree to which that VLAN has been associated by SSTP.

20 Claims, 7 Drawing Sheets

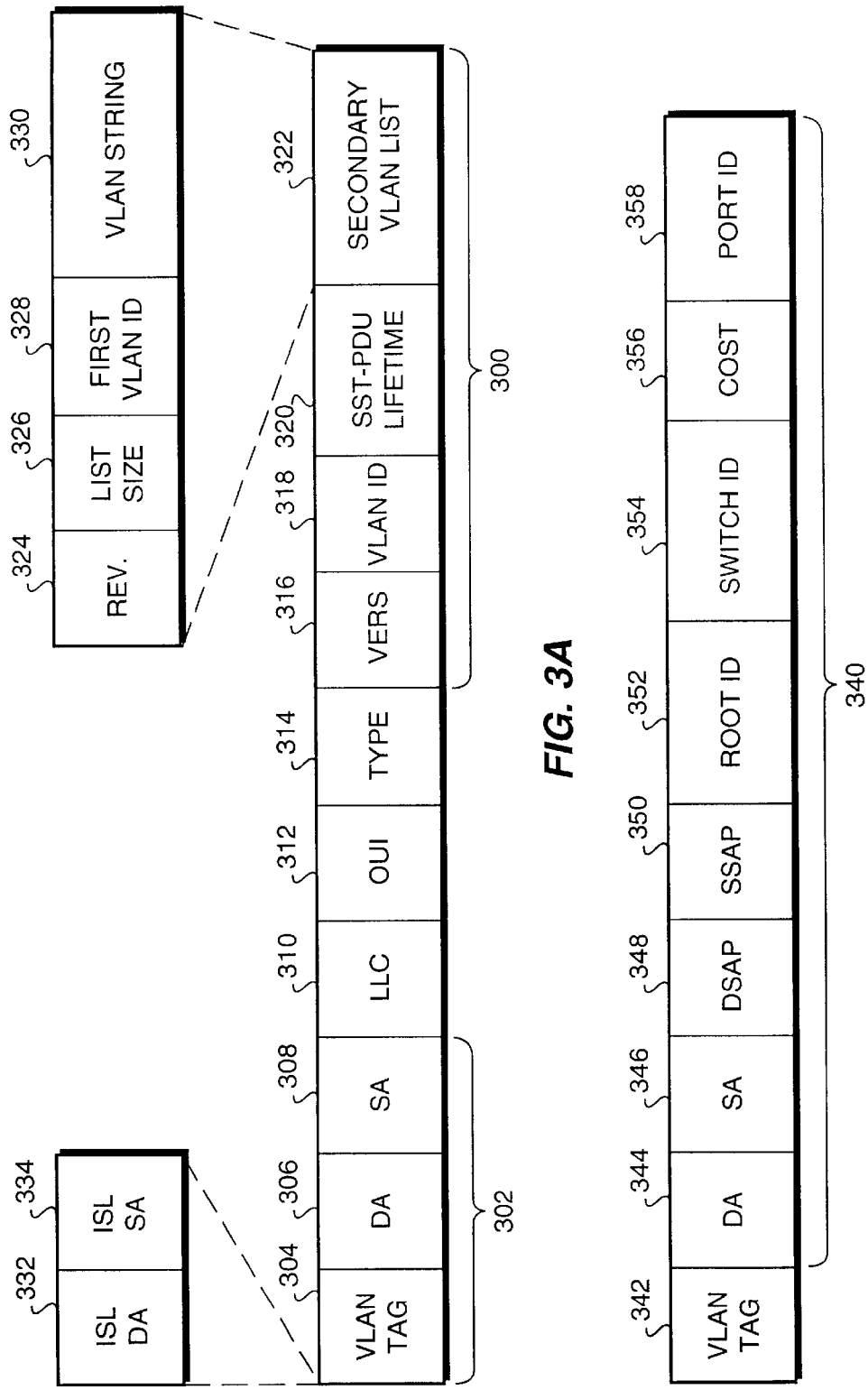

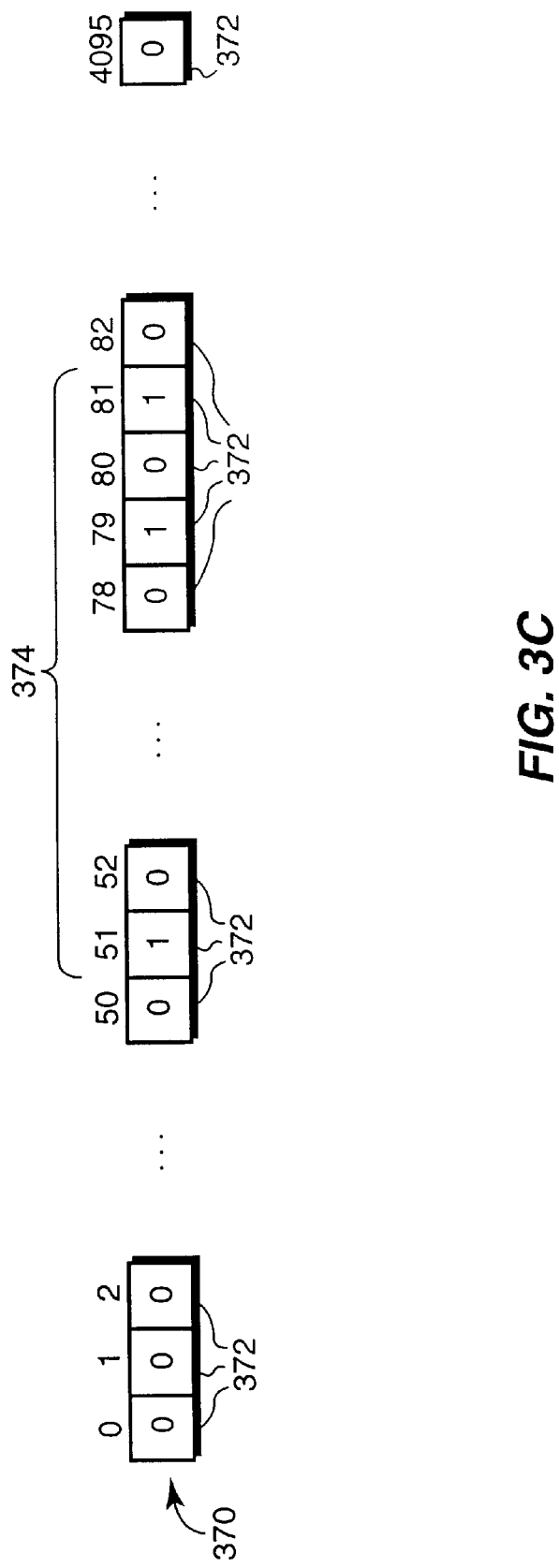

SHARED SPANNING TREE PROTOCOL

This application is a continuation of application Ser. No. 08/997,297, filed Dec. 23, 1997, now U.S. Pat. No. 6,188,694, issued Feb. 13 2001.

FIELD OF THE INVENTION

The present invention relates generally to computer networks and, more specifically, to a shared spanning tree protocol for defining a plurality of loop-free paths within a computer network.

BACKGROUND OF THE INVENTION

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, FDDI or token ring, that defines the functions performed by data link and physical layers of a communications architecture (i.e., a protocol stack). In many instances, several LANs may be interconnected by point-to-point links, microwave transceivers, satellite hook-ups, etc. to form a wide area network ("WAN") or internet that may span an entire country or continent.

One or more intermediate devices is often used to couple LANs together and allow the corresponding entities to exchange information. For example, a switch may be utilized to provide a "switching" function for transferring information, such as data frames, among entities of a computer network. Typically, the switch is a computer and includes a plurality of ports that couple the switch to the other entities. The switching function includes receiving data at a source port from an entity and transferring that data to at least one destination port for receipt by another entity.

In addition, most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic effectively overwhelms the network. Other intermediate devices, such as routers, that operate at higher hierarchical layers, such as the Internetwork Layer of the Transmission Control Protocol/Internet Protocol ("TCP/IP") reference model within the protocol stack, deliver data frames and learn the addresses of entities on the network differently than most bridges or switches, such that routers are generally not susceptible to sustained looping problems.

Spanning Tree Algorithm

To avoid the formation of loops, intermediate devices, such as bridges or switches, execute what is known as a spanning tree algorithm. This algorithm effectively "severs" the redundant links within network segments. More specifically, switches exchange special messages called bridge protocol data unit (BPDU) frames that allow them to calculate a spanning tree, which is a subset of the network segment that is loop-free (i.e., a tree) and yet connects every pair of LANs within the segment (i.e., the tree is spanning). The BPDU frames contain sufficient information, such as the relative cost of transmitting data frames over the links and interconnecting LANs, for the switches to discover a loop-free tree. Using this information, the switches calculate the tree in accordance with the algorithm and typically elect to sever or block all but one of the redundant links or communications paths. The spanning tree algorithm and the BPDU messages are well-known and documented (see IEEE Standard 802.1D).

In particular, execution of the spanning tree algorithm typically causes the switches to elect a single switch, among all the switches within each network segment, to be the "root" switch. The root is the switch having the lowest identifier (switch ID) of all switches in the particular network segment. Switch IDs, moreover, typically include a fixed portion and a settable portion. Accordingly, by modifying the settable portion of the ID of a given switch, a network administrator may "force" the network to elect that switch as the root. In addition, for each LAN coupled to more than one switch, a "designated switch" is elected which will forward frames from the LAN toward the root. The designated switch is typically the closest switch to the root.

Each switch also chooses a port (e.g., the "root port") which gives the best path from the switch to the root and selects those ports that are to be included in the spanning tree (i.e., the root port and any port for which the switch has been elected as a designated switch). These ports are placed in a forwarding mode so that data frames may be forwarded to and from the ports and thus onto the corresponding paths or links. Ports not included within the spanning are placed in a blocking mode. When a port is in the blocking mode, the associated switch will not forward any data frames to or from that port.

As links fail or are repaired or as new links are added to a network, the spanning tree is re-calculated. In response, ports may transition from the blocking mode to the forwarding mode and vice versa. Rather than transition directly from the blocking mode to the forwarding mode, ports transition through two intermediate states: a listening state and a learning state. In the listening state, a port waits for information suggesting that it should return to the blocked mode. If, at the expiration of a timer, no such information has been received, the port transitions to the learning state. In the learning state, a port still blocks the forwarding of frames but received frames are examined and the location information contained therein, including the source of the frame, is stored. At the expiration of a second timer, the port finally transitions to the forwarding mode where frames may be forwarded from and received at the port.

Virtual Local Area Networks

A computer network may also be segregated into a series of network groups. For example, U.S. Pat. No. 5,394,402, issued on Feb. 28, 1995 to Floyd E. Ross (the "'402 Patent") discloses an arrangement that is capable of associating any port of a switch with any particular segregated network group. Specifically, according to the '402 Patent, any number of physical ports of a particular switch may be associated with any number of groups within the switch by using a virtual local area network (VLAN) arrangement that virtually associates the port with a particular VLAN designation. More specifically, Ross discloses a switch or hub for a segmented virtual local area network with shared media access that associates VLAN designations with at least one internal port and further associates those VLAN designations with messages transmitted from any of the ports to which the VLAN designation has been assigned.

The VLAN designation for each internal port is stored in a memory portion of the switch such that every time a message is received by the switch on an internal port the VLAN designation of that port is associated with the message. Association is accomplished by a flow processing element which looks up the VLAN designation in a memory based on the internal port where the message originated. In addition to the '402 patent, an IEEE standards committee is preparing a standard for Virtual Bridged Local Area Networks. See IEEE Standard 802.1Q (draft).

In many cases, it may be desirable to interconnect a plurality of these switches in order to extend the VLAN associations of ports in the network. Ross, in fact, states that an objective of his VLAN arrangement is to allow all ports and entities of the network having the same VLAN designation to interchange messages by associating a VLAN designation with each message. Thus, those entities having the same VLAN designation function as if they are all part of the same LAN. Message exchanges between parts of the network having different VLAN designations are specifically prevented in order to preserve the boundaries of each VLAN segment.

Having defined a segregated computer network, several "solutions" have been proposed for overlaying spanning trees on these virtually segregated network groups. The IEEE 802.1Q standards committee, for example, has proposed defining a single spanning tree for all VLAN designations in the computer network. That is, the switches exchange conventional BPDUs in the accustomed manner so as to define a single forwarding topology irrespective of the various VLAN designations that have been defined for the network. Thus, either all frames may be forwarded and received through a given port or no frames may be forwarded or received through the port. Since bridges and switches are typically pre-configured to exchange and process conventional BPDUs, this is a simple solution to implement.

Nonetheless, the IEEE solution has several drawbacks. For example, by defining a single spanning tree for a network having numerous VLAN designations, the IEEE solution does not allow for load balancing. That is, all data communication within the network follows the single forwarding topology defined by the one spanning tree. This may significantly degrade performance over certain, heavily utilized, portions of the network, severely limiting message throughput.

An alternative to the 802.1Q approach defines a separate spanning tree for each VLAN designation within the network and is currently being offered by Cisco Systems, Inc. See Cisco IOS VLAN Services document. With this approach, switches exchange BPDUs, each of which is tagged with a VLAN designation. That is, tagged BPDUs are formulated and exchanged for each VLAN designation within the network. These tagged BPDUs are then processed by the switches so as to define a separate forwarding topology or spanning tree for each VLAN designation. Thus, for a given port, messages associated with one VLAN designation may be forwarded and received whereas messages associated with a second VLAN designation may not.

By defining a separate forwarding topology for each VLAN designation which spans all entities associated with that designation, this solution supports load balancing throughout the network. It also avoids possible lost connectivity problems with portions of the network that may occur with the IEEE solution. There are, nonetheless, other drawbacks. First, this approach may not scale well to large networks. That is, as the number of VLAN designations increases, the number of tagged BPDUs being exchanged correspondingly increases. Accordingly, more communications bandwidth is consumed with BPDU traffic. Each BPDU, moreover, must be processed by the switches so as to calculate the corresponding spanning trees. Depending on the number of VLAN designations within the network, this may severely tax the processing and memory resources of the switches, degrading network efficiency.

SUMMARY OF THE INVENTION

It is an object of the present invention to provide a method and apparatus for defining a series of spanning trees that is scaleable to large networks having numerous virtual local area network designations.

It is a further object of the present invention to provide a method and apparatus for defining sufficient spanning trees to permit load balancing within the network.

It is a further object of the present invention to provide a protocol for defining a series of spanning trees without imposing a high processing load on the intermediate devices, thereby improving scalability.

It is a further object of the present invention to provide a protocol that is compatible with non-enabled devices (i.e., devices that do not execute the protocol) such as standard IEEE 802.1Q devices and the current devices from Cisco Systems, Inc.

Briefly, the invention comprises a shared spanning tree protocol (SSTP) for creating a plurality of spanning trees (i.e., loop-free paths) which are shared among one or more virtual local area network (VLAN) designations within a computer network. In one aspect of the invention, the SSTP manifests as an exchange of novel shared spanning tree protocol data units (SST-PDUs) among network devices so as to associate each VLAN designation with a single shared spanning tree. Each shared spanning tree, moreover, includes and is defined by a primary VLAN and may include any number of secondary VLANs.

The association of VLAN designations to shared spanning trees preferably depends on which forwarding topology is desired and on the anticipated load characteristics of the various VLANs and may be pre-configured along with the identities of the primary VLANs at one or more network devices. For example, one shared spanning tree may include a single high traffic VLAN (e.g., the primary VLAN) and several low traffic VLANs (e.g., the secondary VLANs) while a second shared spanning tree may include several moderate traffic VLANs. The total number of shared spanning trees implemented by SSTP is thus greater than one but less than the total number of VLANs. Data frames tagged with a particular VLAN designation are then distributed by the devices only along the shared spanning tree to which that VLAN has been associated by SSTP.

The contours (i.e., paths) of each shared spanning tree are defined through the exchange and processing of tagged bridge protocol data units (BPDUs). In another aspect of the invention, a device, pursuant to SSTP, formulates and exchanges BPDUs tagged only with primary VLAN designations. Devices generally do not exchange untagged BPDUs or BPDUs tagged with secondary VLAN designations, except to possibly satisfy backwards compatibility with non-SST enabled devices, including devices compatible with the IEEE 802.1Q standard. This substantially reduces the amount of communications traffic and processor load as compared to the per-VLAN spanning tree solution. By processing these primary VLAN tagged BPDUs, devices define the contours of each shared spanning tree. Through the exchange of SST-PDUs, devices then associate each VLAN designation with a single predefined shared spanning tree for subsequent data exchange.

Each SST-PDU frame preferably contains, among other information, a field corresponding to the VLAN tag appended to the frame and, if the tag corresponds to a primary VLAN, a list of the associated secondary VLANs. Another field may be used to set the time interval by which the receiving device is to keep the information contained in the SST-PDU. As VLANs are moved among shared spanning trees and new primary VLANs are designated, new SST-PDUs are generated and exchanged among network devices so as to replace the previously stored information.

In the illustrated embodiment, the SST protocol is implemented by means of a novel state machine engine executing at each device for each VLAN designation. Preferably, the state machine engine includes three states (i.e., disassociated, wait and associated) that transition in response to the information contained in SST-PDUs received by the device. In particular, the state machine engine copies information from each received SST-PDU into an association table organized by VLAN designation. If the information in the association table indicates that a given VLAN designation is associated with either none or more than one shared spanning tree, then the state machine engine enters the disassociated state and no data frames tagged with this VLAN designation are forwarded by the device.

As additional SST-PDUs are received, the device replaces stale information in its association table with newly received information. Once the association table indicates that the VLAN is associated with only one shared spanning tree, the state machine engine preferably enters a wait state while that condition is allowed to propagate throughout the network. After sufficient time has elapsed so as to ensure that the information has been received at each device and assuming no contrary information has been received, the state machine engine transitions to an associated state. Here, the VLAN is associated with exactly one shared spanning tree and data frames tagged with this VLAN designation may be received and forwarded by the device along this spanning tree.

BRIEF DESCRIPTION OF THE DRAWINGS

The above and further advantages of the invention may be better understood by referring to the following description in conjunction with the accompanying drawings, in which:

FIG. 3A is a block diagram of a preferred Shared Spanning Tree Protocol Data Unit;

FIG. 3B is a block diagram of a tagged bridge protocol data unit;

FIG. 3C is a block diagram of a bitstring for listing secondary VLANs;

DESCRIPTION OF THE PREFERRED EMBODIMENT

Figure 1:
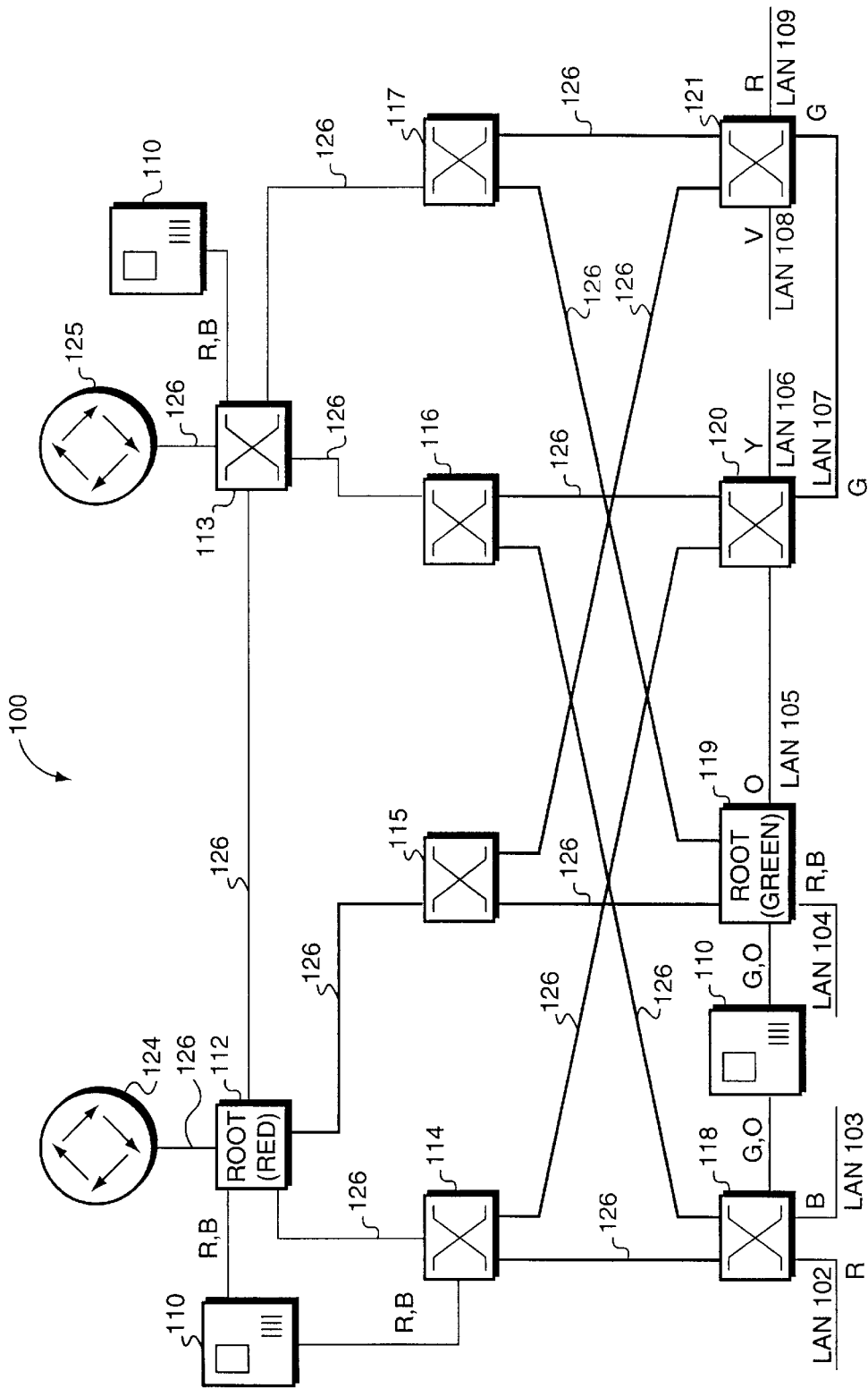
FIG. 1 is a highly schematic diagram of a computer network in accordance with the present invention.

FIG. 1 illustrates a partially meshed computer network 100 in accordance with the present invention. The network 100 preferably comprises a plurality of local area networks (LANs) 102–109 and servers 110, such as file servers, print servers, etc., interconnected by a plurality of intermediate devices, such as switches 112–121. One or more entities or hosts (not shown) are preferably coupled to each LAN 102–109 so that the entities may source or sink data frames to one another or to the servers 110 over the network 100. Each switch 112–121, moreover, preferably includes a plurality of ports such that each LAN 102–109 and server 110 is coupled to at least one port of switches 112–121.

The network 100 may further include one or more routers 124, 125. Switches 112–121 and routers 124, 125 are preferably interconnected by a series of links 126, such as point-to-point links. Links 126 carry messages, such as data frames, between switches 112–121 and routers 124, 125. Each switch 112–121 and router 124, 125 of network 100 identifies its own ports, e.g., by port numbers one, two, three, etc. Switches 112–121 and routers 124, 125 are thus able to associate specific ports with the LANs, switches, routers, servers, etc. coupled thereto.

It should be understood that the network 100 of FIG. 1 is meant for illustrative purposes only and that the present invention will operate with other networks having possibly far more complex topologies.

As set forth in the '402 Patent and/or the IEEE 802.1Q standard, various LANs, servers and other devices may be grouped together to form virtual local area networks (VLANs). As shown in FIG. 1, each VLAN may be identified by a color code, e.g., "R" for red, "B" for blue, "G" for green, "O" for orange, "Y" for yellow and "V" for violet. More specifically, switches 112–121 associate each port coupled to a LAN or server with at least one VLAN designation (e.g., a color tag). For example, switches 118 and 121 may each associate their ports coupled to LANs 102 and 109, respectively, with the "red" VLAN designation, thereby grouping these LANs together. Since all entities located on a given LAN (e.g., LAN 102) utilize the same shared port of the corresponding switch (e.g., switch 118), each of these entities is also associated with the VLAN designation(s) assigned to that port (e.g., red). Switches 112 and 113 may similarly associate their ports coupled to servers 110 with the red and blue VLAN designations, thereby allowing entities associated with either the red or blue VLAN designations to communicate with these servers.

Those ports of switches 112–121 and routers 124, 125 coupled to links 126 are similarly associated with one or more VLAN designation(s). The VLAN designations associated with these ports preferably correspond to the VLANs that are reachable through that port. For example, switch 121 may associate each port coupled to links 126 with the red, violet and green VLAN designations, among others, to provide connectivity to red, violet and/or green designated LANs (e.g., LAN 102) or servers 110 reachable via that link 126.

To identify the various VLAN designations defined throughout the network 100, switches 112–121 and routers 124, 125 typically participate in a VLAN configuration protocol, such as the VLAN Trunk Protocol (VTP) from Cisco Systems, Inc. or the GARP VLAN Registration Protocol (GVRP), that informs each switch and router of the current state of VLAN designations in use throughout the network 100. In accordance with these protocols, each switch 112–121 and router 124, 125 transmits predefined advertisements containing information regarding the current VLAN configuration at the sourcing device. By listening for the advertisements, devices may learn of any re-configuration of the network 100, including deleting an existing VLAN or changing the parameters of an existing VLAN. Thus, the current association of VLAN designations may be quickly propagated to all intermediate devices.

In addition, each switch 112–121 preferably maintains a list of pre-defined numeric identifiers (e.g., numbers) that are available for assignment as VLAN IDs. As each VLAN designation (e.g., color code) is established by the network administrator, a particular number is assigned thereto from the list. The list thus represents the maximum number of VLAN designations that may be supported within the network 100. For example, the IEEE 802.1Q draft standard specifies a list from "0" to "4095" and thus allows for 4096 different VLAN IDs. The first VLAN designation that is established (e.g., red) may be assigned to number "3" and the second VLAN (e.g., blue) may be assigned number "25". The green, orange, violet and yellow VLAN designations may be assigned to numbers "50", "51", "79" and "81", respectively. That is, the assignment of numeric VLAN identifiers need not be sequential.

Once the VLAN designations have been established, any entity associated with a given VLAN designation (e.g., red) may exchange messages with any other similarly designated entity, even though the two entities may be physically remote from each other and interconnected by switches that are coupled to other VLANs. Inter-VLAN traffic (e.g., communication from a "red" designated entity to a "blue" designated entity), if permitted, is preferably performed by the routers 124, 125.

As shown, network 100 includes redundant links interconnecting switches 112–121. For example, switch 118 is connected to switch 120 along at least two different paths; first, via switch 114 alone and second, via switches 114, 112, 113 and 116. Similarly, servers 110 are each preferably coupled to the network 100 by more than one link. The existence of such redundant links prevents portions of the network 100 from becoming isolated should any constituent link fail. Such redundancy, however, also results in the creation of loops, which, as described above, are highly undesirable.

Execution of the spanning tree algorithm will prevent loops by defining a loop-free network topology (i.e., an active topology). As set forth above, however, current implementations of the spanning tree algorithm are limited to either a single loop-free topology which precludes load balancing of network traffic or a separate loop-free topology for every VLAN designation which may result in the consumption of substantial communications bandwidth and processor resources. To avoid these disadvantages and to improve the efficient distribution of messages throughout the network 100, among other reasons, a plurality of intermediate devices (e.g., switches, bridges, etc.) preferably execute a Shared Spanning Tree Protocol (SSTP). In the illustrated embodiment, the SSTP protocol is implemented in a state machine environment.

State Machine Environment

Figure 2:
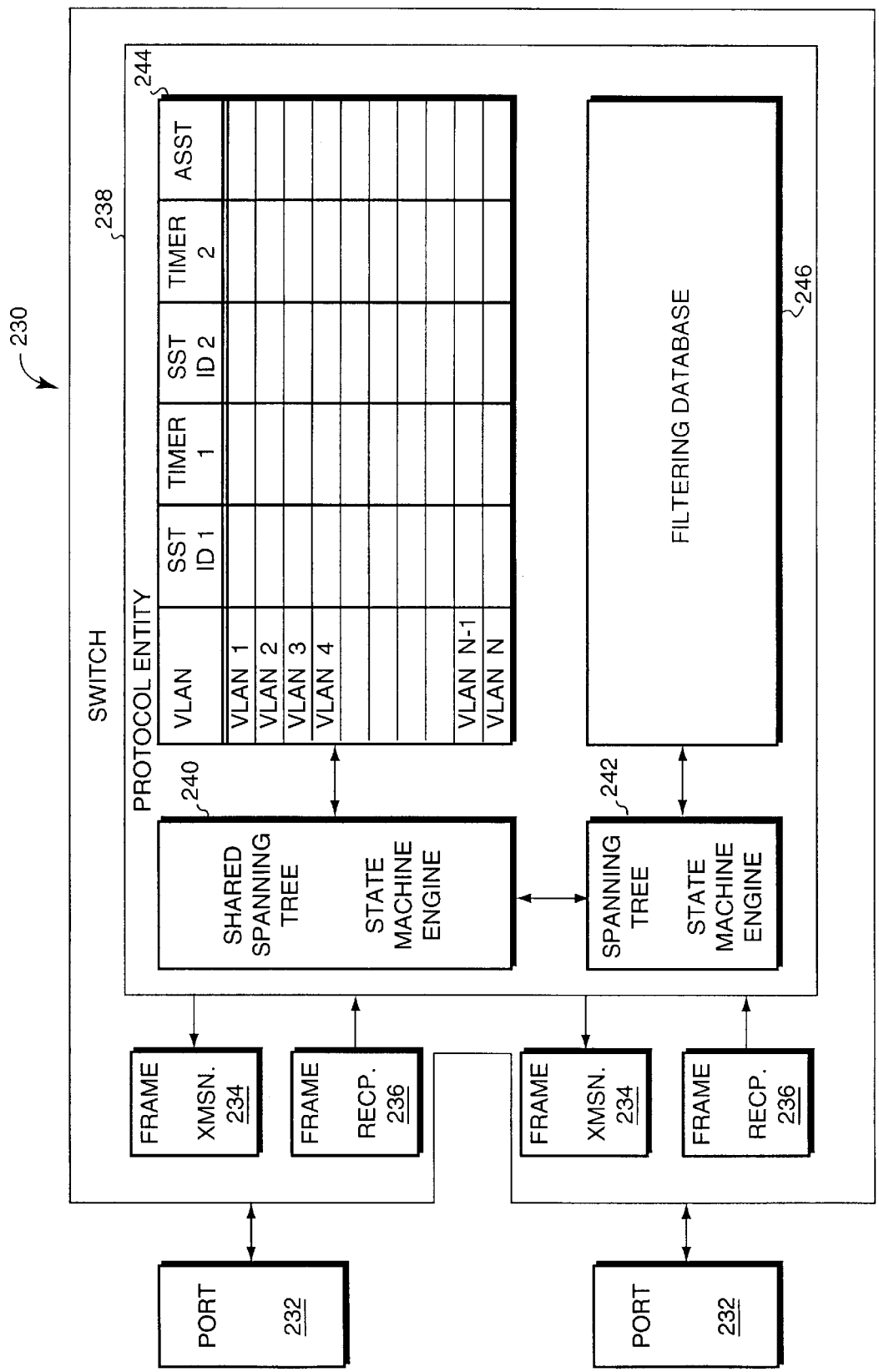
FIG. 2 is a partial block diagram of an intermediate device in accordance with a preferred embodiment of the present invention.

FIG. 2 is a partial block diagram of a switch 230 similar to switches 112–121 of FIG. 1. Switch 230 includes a plurality of ports 232 each of which is preferably coupled to a LAN, server, switch, router, etc. A switch suitable for use with the present invention is described in U.S. patent application Ser. No. 08/623,142 filed Mar. 28, 1996 and entitled INTERSWITCH LINK MECHANISM FOR CONNECTING HIGH-PERFORMANCE NETWORK SWITCHES U.S. Pat. No. 5,742,604 which is hereby incorporated by reference in its entirety.

Associated with each port 232 is a frame transmission object 234 and a frame reception object 236. Frames received at a given port 232 may be captured by the corresponding frame reception object 236 and frames to be transmitted from the port are received from the frame transmission object 234. The frame reception and transmission objects 234, 236 preferably communicate with a protocol entity 238. More specifically, the frame reception object 236 passes received frames to the protocol entity 238 and the transmission object 234 may receive frames to be transmitted from entity 238. Objects 234, 236 are preferably message storage structures, such as queues.

The protocol entity 238 preferably includes at least one shared spanning tree (SST) state machine engine 240 and at least one spanning tree (ST) state machine engine 242. Each SST engine 240 is preferably coupled to an association table 244 which includes a plurality of rows and columns. Each row or entry of table 244 is preferably associated with a VLAN designation (e.g., red, blue, etc.) configured within network 100 (FIG. 1). In addition, each entry is associated with a plurality of cells, corresponding to the columns of table 244. The cells preferably include a Shared Spanning Tree (SST) ID1 cell and a corresponding Timer 1 cell and a Shared Spanning Tree (SST) ID2 cell and its corresponding Timer 2 cell. An associated cell is also established for each entry. As discussed below, these cells contain information relating to the shared spanning tree protocol. Each ST engine 242 is preferably coupled to a filtering database 246.

It will be understood to those skilled in the art that the tables 244, 246 may be implemented as content addressable memory (CAM) devices and that the state machine engines 240, 242 may comprise registers and combinational logic configured to produce sequential logic circuits. In the illustrated embodiment, the state machine engines 240, 242 preferably comprise programmable processing elements containing software programs pertaining to the methods described herein and executable by the processing elements. Other computer readable media may also be used to store and execute the program instructions. The state machine engines 240, 242 preferably cooperate to define a plurality of shared spanning trees each of which defines an active topology for one or more VLAN designations.

SST-PDU Frame Format

FIG. 3A is a block diagram of a preferred Shared Spanning Tree Protocol Data Unit (SST-PDU) frame 300. Attached to SST-PDU frame 300 may be a header 302 that is compatible with the Media Access Control (MAC) layer of a protocol stack implemented by the port sourcing the SST-PDU frame 300. The format of header 302 may correspond to a conventional Subnetwork Access Protocol (SNAP). Header 302 preferably comprises a plurality of fields, including a VLAN tag field 304, a destination MAC address field 306 and a source MAC address field 308. Although shown preceding the destination and source address fields 306, 308, the VLAN tag field 304 may be placed anywhere within header 302. Other fields, in addition to those comprising header 302, may also be attached to the SST-PDU frame 300. These additional fields may include a Logical Link Control field 310, an organization unique identifier (OUI) field 312 and a type field 314. The OUI and type fields 312, 314 are preferably used to identify the frame as an SST-PDU frame 300.

The SST-PDU frame 300 similarly includes a plurality of fields. In particular, the SST-PDU 300 may include a version field 316, which may be used to indicate which version of the Shared Spanning Tree Protocol frame 300 is associated. A VLAN ID field 318 preferably carries the VLAN designation of the primary or secondary VLAN for which the SST-PDU 300 was generated, as described below. An SST-PDU lifetime field 320 may be used by the receiving device to determine how long to keep information in a received SST-PDU 300. A secondary VLAN list 322, which may itself comprise a plurality of fields, may be used to identify secondary VLAN designations.

Preferably, fields 318, 320 and 322 are each tag-length-value (TLV) fields. That is, the first two bytes of these fields may represent type information, the next two bytes length information and the remaining bytes the actual data or value carried by the field. By arranging fields 318, 320 and 322 as TLVs, the information carried by these fields may be easily modified as implementations of the protocol are changed or up-dated. It should be understood that other fields of SST-PDU 300 may also be implemented as TLVs.

In addition, the secondary VLAN list 322 may include a revision field 324, a list size field 326, a First VLAN ID field 328 and a VLAN string field 330. As described in more detail below, the First VLAN ID field 328 preferably contains the identity of the first VLAN designation in the secondary VLAN list 322. The VLAN string field 330 contains the complete list of secondary VLANs corresponding to list 322.

It will be understood to those skilled in the art that additional fields or TLVs may also be used in SST-PDU 300. For example, rather than utilize a VLAN list, the SST-PDU may simply include an SST ID field (not shown) that may be loaded with the primary VLAN corresponding to the secondary VLAN loaded into the VLAN ID field. By parsing the contents of these two fields, a receiving device would thus learn that the secondary VLAN from the VLAN ID field is associated with the primary VLAN of the SST ID field. Those skilled in the art will understand that other such fields or approaches may be used to convey the association of secondary VLANs with primary VLANs.

Header 302 allows SST-PDU frames 300 to be transmitted over links configured to carry VLAN tagged frames. These links may be compatible with the draft IEEE 802.1Q standard. Other fields in place of or in addition to header 302 may be utilized to support or improve the transmission of SST-PDU frames 300 across these or other types of links. For example, Cisco Systems, Inc. has developed an Inter-Switch Link (ISL) mechanism (see U.S. patent application Ser. No. 08/623,142 filed Mar. 28, 1996 and entitled INTER-SWITCH LINK MECHANISM FOR CONNECTING HIGH-PERFORMANCE NETWORK SWITCHES) which keeps the VLAN associations of tagged messages intact during transmission across shared network media. To permit the transmission of SST-PDU frames 300 over ISL configured links, an ISL destination address field 332 and an ISL source address field 334 may be appended to header 302. These fields 332, 334 specify respective destination and source port interface circuitry (not shown) used to interconnect switches via an ISL link.

Each port 232 (FIG. 2) is preferably pre-configured in accordance with a particular protocol or standard, such as the 802.1Q draft standard, the ISL mechanism, or some other transport protocol or standard. Accordingly, each SST engine 240 "knows" what format to utilize when formulating SST-PDU frames 300 for transmission through any switch port 232.

BPDU Frame Format

FIG. 3B is a block diagram of a bridge protocol data unit (BPDU) 340 for use with the present invention. The BPDU 340 preferably includes a VLAN tag field 342 so as to form a tagged BPDU. The BPDU 340 further includes destination and source MAC address fields 344, 346 and DSAP and SSAP fields 348, 350. A root ID field 352 preferably contains the identifier of the switch assumed to be the root and a switch ID field 354 contains the identifier of the switch transmitting the BPDU 340. A cost field 356 contains the cost of the least cost path to the root from the transmitting switch. Finally, a port ID field 358 contains an identifier corresponding to the port through which the BPDU 340 is transmitted.

Creation of Shared Spanning Trees

Each VLAN designation utilized in network 100 is first classified as either a primary VLAN or a secondary VLAN. Each primary VLAN corresponds to a single shared spanning tree or forwarding topology defined within the network 100 (FIG. 1). That is, a given shared spanning tree is identified and defined by its corresponding primary VLAN. Each secondary VLAN is preferably associated with one primary VLAN and thus one shared spanning tree for message forwarding purposes, through the exchange and processing of SST-PDUs 300.

A VLAN is classified as primary in order to define a distinct forwarding topology within the network. Thereafter, other VLANs may be classified as secondary and associated with that primary VLAN so that traffic along those secondary VLANs will follow the topology defined by the primary VLAN. For example, a primary VLAN may be defined so as to utilize a secure link within the network and other VLANs needing to use the secure link may be classified as secondary VLANs and associated with that primary VLAN. The classification and association of VLANs also preferably depends on the anticipated traffic along the VLANs. Ideally, those VLAN designations which are anticipated to generate a large amount of network traffic are preferably separated from each other either by designating each such "high-traffic" VLAN as a primary VLAN or at least associating it with a different primary VLAN, as described below. Other VLANs which are not anticipated to generate substantial network traffic are preferably divided between the primary VLAN designations so as balance the anticipated load between the various groups.

Once the VLAN designations have been classified, each switch 112–121 is preferably pre-configured with the identity of all primary VLAN designations and all secondary VLAN designations, but not with the association of secondary VLANs to primary VLANs. The pre-configuration of primary and secondary VLAN information may be accomplished in a number of ways. For example, a network administrator may issue appropriate commands to the switches 112–121 instructing them to designate one or more VLAN designations as primary VLANs and the remaining VLAN designations as secondary VLANs. The designation or classification information may be stored at each switch in a portion of memory (not shown) allocated to the Shared Spanning Tree Protocol.

Alternatively, a protocol, such as the VLAN Trunk Protocol (VTP) from Cisco Systems, Inc., which propagates VLAN designation information, may be utilized to propagate primary/secondary VLAN designation information as well. Specifically, using VTP, a network administrator issues commands at one switch which then forwards the commands to its neighbor switches which similarly forward the commands so that they are received throughout the network. In this way the commands, entered at a single switch, are automatically propagated to all switches in the network. Here, the commands may be used to identify VLANs as primary or secondary VLANs. Once the information has been entered at one switch by a network administrator, the switches, through VTP, ensure that the information is propagated throughout the network.

In addition to configuring each switch with information regarding which VLANs are primary VLANs and which are secondary VLANs, the root associated with each primary VLAN (i.e., shared spanning tree) is also configured with the association of secondary VLAN designations to that primary VLAN. That is, the network administrator preferably chooses which switch will be the root for each primary VLAN. The settable portion of the corresponding switch ID is then modified so as to ensure that the switch is indeed selected as the root during execution of the spanning tree algorithm. The root switches, each of which is assigned one or more primary VLANs, are then pre-configured with the identity of the associated secondary VLANs corresponding to the assigned primary VLAN(s). Thus, the roots "know" which VLANs are primary VLANs and, in addition, which VLANs are associated as secondary VLANs to those primary VLANs for which it is the root. Non-root switches, however, are not necessarily configured with information regarding the association of secondary VLANs to primary VLANs, but learn of these associations from received SST-PDUs.

The association of secondary VLANs with primary VLANs is preferably stored in the roots' association tables 244 (FIG. 2). That is, in the entry for each secondary VLAN at table 244, the identifier of the corresponding primary VLAN is stored at either the SST-ID1 or SST-ID2 cell.

Upon start-up, each switch begins transmitting tagged BPDUs 340 from its ports 232 (FIG. 2). More specifically, each switch preferably includes a separate spanning tree state machine engine 242 for each primary VLAN. Each engine 242 within each switch 230, moreover, formulates and sends BPDUs 340 tagged with the primary VLAN designation for which it is associated. That is, each engine 242 loads its primary VLAN designation into the VLAN tag field 304 and its switch ID into the root ID field 352 since, at least initially, each switch assumes that it is the root for that primary VLAN. The tagged BPDU 340 is then sent through each port 232 of the switch which has been associated with this VLAN designation (i.e., the VLAN designation loaded into tag field 342). BPDUs 340 tagged with the various primary VLAN designations are thus emitted from each switch 112–121 (FIG. 1) in network 100.

Tagged BPDUs 340 formulated and sent by neighboring switches are consequently received at each switch 112–121, captured by the corresponding frame receptor objects 236 and forwarded to the spanning tree engine 242 associated with the primary VLAN designation listed in the VLAN tag field 342 of the received BPDU 340. The contents of the received BPDUs 340 are examined and processed by engines 242 preferably in accordance with the IEEE 802.1D standard. That is, received BPDUs 340 may contain "better" root identifiers than the switch's own ID which was loaded into field 352. The best known root identifier (typically the identifier with the lowest value) for each primary VLAN designation is loaded into the root ID field 352 of subsequent BPDUs formulated by each engine 242. Similarly, the contents of the cost field 356 of received BPDUs 340 are up-dated and the new BPDUs 340 transmitted through the corresponding ports 232 of the switch 230.

By processing the information in received BPDUs 340 tagged with primary VLAN designations and transmitting new BPDUs 340 to each other, switches 112–121 eventually converge with the selection of a single root for each primary VLAN designation. Each switch 112–121, moreover, identifies a root port for each primary VLAN designation and for each LAN coupled to multiple switches a designated switch and port are selected for each VLAN designation. During this process, these root and designated ports transition from the blocked mode to the forwarding mode via the listening and learning states in accordance with the spanning tree algorithm. Upon convergence of the spanning tree algorithm, a single active topology (i.e., a "shared spanning tree") is defined throughout network 100 for each primary VLAN designation.

Referring to FIG. 1, assume that switches 112–121 have been pre-configured such that the red and green VLANs are primary VLANs and the blue, orange, violet and yellow VLANs are secondary VLANs. Accordingly, each switch will have two spanning tree engines 242; one associated with the red VLAN and other with the green VLAN. Assume further that the switch ID of switch 112 has been modified so that it will be the root for the red VLAN and that the ID of switch 119 has similarly been modified so that it will be the root for the green VLAN. Execution of the spanning tree algorithm, through the exchange of tagged BPDUs 340 as described above, will result in a first active topology corresponding to the red VLAN and a second active topology corresponding to the green VLAN. Thus, each switch 112–121, except for the root switches themselves, has a root port for the red primary VLAN and a root port for the green primary VLAN which may be the same or a different port.

At this point, data frames tagged with primary VLAN designations (e.g., red and green) may be forwarded through the network 100, since a corresponding active topology has been defined for these VLANs. That is, a shared spanning tree exists for each primary VLAN, thereby connecting, for example, each "red" LAN within network 100 by establishing which ports are capable of transmitting messages (i.e., forwarding ports) and which are not (i.e., blocked ports). Data messages tagged with secondary VLAN designations (e.g., blue, orange, violet and yellow), however, can be forwarded only if the secondary VLAN is associated with exactly one primary VLAN. If so, the messages are forwarded along the spanning tree corresponding to the associated primary VLAN.

Switches associate secondary VLANs with primary VLANs through the exchange of SST-PDUs 300. In particular, as selected ports 232 (FIG. 2) at each root 112, 119 transition to the learning state, during execution of the spanning tree algorithm, the roots preferably start formulating SST-PDUs 300 for transmission out those port 232. Each switch, including the roots 112, 119, preferably includes one shared spanning tree state machine engine 240 for each VLAN designation (primary and secondary).

Since only the roots initially "know" the association of secondary VLANs with primary VLANs, propagation of SST-PDUs within network 100, at least initially, originates from the roots. That is, the roots are pre-configured with the association of secondary VLANs to primary VLAN(s) for which the root has been selected. At root 119, for example, the shared spanning tree engine 240 associated with the green VLAN designation formulates an SST-PDU 300 and loads the corresponding primary VLAN designation (e.g., green) into the VLAN ID field 318. Since this SST-PDU 300 has the primary VLAN designation loaded into field 318, engine 240 preferably utilizes secondary VLAN list 322 to identify the corresponding secondary VLANs (e.g., orange, violet and yellow).

The representation of secondary VLAN information within list 322 is preferably via a bitstring. More specifically, as shown in FIG. 3C, a bitstring 370 having a bit 372 for each possible numeric VLAN identifier is preferably created by the shared spanning tree engine 240. Accordingly, under the 802.1Q draft standard, bitstring 370 will have a total of 4096 bits. Engine 240 then moves through the bitstring 370 asserting only those bits 372 corresponding to secondary VLANs that are associated with the primary VLAN. For example, for the green primary VLAN, engine 240 at root 119 asserts the fifty-first, seventy-ninth and eighty-first bits in the bitstring 370, corresponding to the orange, violet and yellow numeric VLAN identifiers, respectively. The remaining bits 372 of bitstring 370 are preferably left unasserted.

Next, engine 240 loads bitstring 370 into the VLAN string field 330 of the SST-PDU 300 being formulated. More specifically, engine 240 preferably loads only a portion 374 of the bitstring 370 into field 330 so as to reduce the overall length of field 330. The selected portion 374 loaded into field 330 preferably includes all of the bits 372 that have been asserted. Thus, in this case, portion 374 spans numeric VLAN identifiers "51" through "81". In order for a receiving switch to correlate the selected portion 374 of bitstring 370 to its own list of numeric VLAN identifiers, engine 240 preferably loads the First VLAN ID field 328 of the SST-PDU 300 with the first numeric VLAN identifier (e.g., "51") from portion 374. By examining the contents of field 328, a receiving switch can thus determine where the portion 374 starts. Furthermore, by simply examining which bits are asserted, the receiving switch learns which secondary VLANs are associated with the primary VLAN (as identified in VLAN ID field 318).

It should be understood that the root may load the entire bitstring 370 into field 330, although this approach would often result in the transmission of a substantial amount of unnecessary information (since many, if not most, of the bits may be left unasserted) and require the receiving switches to examine a large number of bits, thereby wasting valuable communications, processor and memory resources.

It should be further understood that the SST-PDU need not contain a VLAN ID field. In this case, switches receiving the SST-PDU associate the list of secondary VLANs with the primary VLAN with which the SST-PDU has been tagged.

Additionally, one or more fields of the SST-PDU 300 may be appended to BPDUs 340. For example, VLAN ID field 318 may be appended,to BPDU 340 after the port ID field 358. SST-PDU lifetime field 320 and secondary VLAN list field 322 may similarly be appended to BPDU 340. Upon receipt of such modified BPDUs, an SST-enabled switch may be able to associate the primary VLAN loaded into the VLAN ID field with the secondary VLANs listed in the secondary VLAN list field, if any.

Root 119 may also load list size field 326 with a value corresponding to the number of bits in the portion 374 of bitstring 370 loaded into field 330. If there are no secondary VLANs associated with this primary VLAN, field 326 is set to zero. In addition, root 119 loads SST-PDU lifetime field 320 with a value corresponding to the length of time that receiving switches should keep the information contained in the SST-PDU 300. The root 119 also selects a value for use in identifying the particular contents of the VLAN string field 330 which is then loaded into revision field 324. Next, header 302 is appended to the SST-PDU 300. In particular, the root loads the VLAN tag field 304 with the same VLAN designation previously loaded into field 318. If the intended port of transmission is an ISL port, then ISL fields 332, 334 may also be appended to the SST-PDU 300.

Engine 240 then transmits the SST-PDU 300 out all trunk ports associated with the green VLAN designation which are in the learning or forwarding states for receipt by the neighboring switches. Since SST-PDUs 300 are intended to be received by neighboring switches, they are preferably only transmitted from ports coupled to links 126 (FIG. 1). SST-PDUs 300 may nonetheless be transmitted through ports coupled to LANs 102–109 or servers 110.

Upon receipt at the corresponding port 232 (FIG. 2) of the neighboring switch 230, the SST-PDU 300 is captured by the associated frame reception object 236 and passed to the shared spanning tree engine 240 corresponding to the VLAN designation loaded in the VLAN tag field 304. This engine 240 processes the SST-PDU 300. In particular, receiving engine 240 examines the VLAN ID field 318 and determines, based upon its own pre-configuration data, whether the VLAN designation loaded therein (e.g., "green") corresponds to a primary or secondary VLAN. Since it corresponds to a primary VLAN, engine 240 next examines field 326 to see whether there is a list of secondary VLANs in field 330 and, if so, how long that list is. If field 326 were set to zero, engine 240 would understand that there are no secondary VLANs associated with this primary VLAN. In this case, field 326 indicates that the information in VLAN string field 330 is thirty-one bits long.

Engine 240 next determines where the portion 374 of the bitstring 370 loaded in field 330 starts, by examining the contents of field 328. From the information in field 328, engine 240 learns that the portion 374 of bitstring 370 contained in field 330 starts with numeric VLAN identifier "51" (i.e., the orange VLAN). By parsing the contents of portion 374, engine 240 learns that the orange, violet and yellow secondary VLANs are all associated with the green primary VLAN.

Engine 240 then proceeds to enter this information into its association table 244. More specifically, engine 240 performs a look-up on table 244 for each secondary VLAN designation identified in portion 374. If an entry does not exist, it is created by engine 240. Next, engine 240 proceeds to each entry of association table 244 corresponding to a secondary VLAN designation in order to store the identification of the associated primary VLAN therein. For example, engine 240 locates the entry of table 244 corresponding to the orange VLAN designation and enters the green VLAN designation from field 318 of the received SST-PDU 300 into either the SST ID1 or SST ID2 cells, assuming both are unasserted. Engine 240 also enters the time from the SST-PDU lifetime field 320 into the timer cell corresponding to the selected SST ID cell. The other SST ID and corresponding timer cells are left unasserted. Since there is only one SST ID stored in table 244 corresponding to the entry for the orange secondary VLAN, engine 240 preferably copies this primary VLAN ID (e.g., green) into the associated cell, thereby associating the orange secondary VLAN with the green primary VLAN. Engine 240 similarly proceeds to modify those entries of table 244 corresponding to the violet and yellow secondary VLAN entries so as to associate these secondary VLANs with the green primary VLAN.

To the extent any ports at the neighboring switch that received the SST-PDU 300 are associated with the VLAN designation from field 304 and are in the learning or forwarding states, the SST-PDU is transmitted out those ports. The SST-PDU is, however, not re-transmitted out the port on which it was received. Consequently, SST-PDUs formulated by root switch 119 are flooded throughout network 100. As each switch receives the SST-PDUs, the information contained therein is examined and the switch's corresponding association table is updated accordingly. Thus, the remaining switches in network 100 learn that the orange, violet and yellow secondary VLAN designations are all associated with the green primary VLAN designation.

Once this information is propagated to and recorded by the switches in network 100, data messages tagged with these secondary VLAN designations may be forwarded through the network 100. For example, once switches 112–121 have associated the orange secondary VLAN designation with the green primary VLAN designation, data messages tagged with the orange VLAN designation are forwarded along the active topology (i.e., the shared spanning tree) defined by the green primary VLAN. Since SST-PDUs are preferably transmitted as ports enter the learning state, the creation of a forwarding topology occurs simultaneously for all VLANS, primary and secondary. That is, as the forwarding topology corresponding to the green primary VLAN is established, devices simultaneously learn that the orange, yellow and violet secondary VLANs are associated with this primary VLAN through the receipt of SST-PDUs. Accordingly, the forwarding of data messages tagged with either primary or secondary VLAN designations typically occurs simultaneously.

To ensure their receipt by all switches in the network 100, additional SST-PDUs 300 are periodically (e.g., every sixteen seconds) sent by root 119 associating the orange, violet and yellow secondary VLAN designations with the green VLAN designation. More specifically, upon transmission of an SST-PDU from the root 119 a timer is set. Upon expiration of the timer, the root 119 formulates and sends another SST-PDU 300. In each supplemental SST-PDUs 300, root 119 enters the same value into the revision field 324, since there has been no change in the association of secondary VLANs. Upon receipt, the non-root switches examine the VLAN ID field 318 and the revision field 324. If the value contained in the revision field 324 is unchanged, the receiving switches know that the secondary VLANs associated with this primary VLAN have not changed. As a result, the receiving switches need not examine or process the VLAN string field 330. Instead, the receiving switches simply reset the timers in their association tables 244 corresponding to the secondary VLAN entries with the value in field 320.

The use of timers in table 244 ensures that stale information is discarded. More specifically, if a switch were to stop receiving SST-PDUs 300 containing information associating a given secondary VLAN with a given primary VLAN, the timer in table 244 corresponding to this secondary VLAN entry will expire. In response, engine 240 preferably discards the information in that entry. These timers are preferably set in cooperation with the frequency in which the roots transmit additional SST-PDUs so as to prevent valid information from being discarded.

Root 112 similarly formulates SST-PDUs 300, but with the red VLAN designation loaded into VLAN tag and VLAN ID fields 304, 318 and the blue VLAN designation entered into the secondary VLAN list 322, thereby indicating that the blue secondary VLAN is associated with the red primary VLAN. These SST-PDUs are received by neighboring switches, examined and forwarded out any trunk ports associated with the red VLAN designation that are in the learning or forwarding states. Accordingly, the association of the blue secondary VLAN with the red primary VLAN is propagated throughout the network 100 (FIG. 1).

Once an active topology or shared spanning tree has been established for each primary VLAN designation and the association of secondary VLANs to primary VLANs has been propagated throughout the network 100, switches 112–121 are ready to forward tagged messages. In particular, upon receipt of a tagged message, it is passed to the shared spanning tree engine 240 corresponding to the VLAN designation tag. Engine 240 looks up table 244 for the entry corresponding to this VLAN designation and examines the associated cell for the identity of the shared spanning tree on which this message is to be forwarded. If the VLAN designation of the message corresponds to a primary VLAN, then this primary VLAN designation will be in the corresponding associated cell. If the VLAN designation of the message is a secondary VLAN, the associated cell will contain the identity of the primary VLAN associated with this secondary VLAN designation. If the associated cell is unasserted (meaning that this VLAN designation is currently associated with either none or more than one primary VLAN), the message is preferably discarded.

Once engine 240 has determined which primary VLAN designation is associated with this tagged message, it is ready to forward the message. In particular, as described above, an active topology or shared spanning tree exists for each primary VLAN designation. Accordingly, the tagged message may be forwarded through any port of the switch that is (1) associated with the primary VLAN designation as determined from the association table and (2) in the forwarding state pursuant to execution of the spanning tree algorithm. For example, messages tagged with the orange, violet and yellow secondary VLAN designations all follow the shared spanning tree corresponding to the green primary VLAN designation.

Although network 100 includes six VLAN designations, only two shared spanning trees are defined and utilized to forward all tagged messages. The shared spanning tree protocol thus allows more than one VLAN designation to utilize the same shared spanning tree. Nonetheless, by allowing the establishment of a plurality of shared spanning trees, the shared spanning tree protocol is able to provide load balancing while reducing the amount of configuration traffic and processing resources needed to define the shared spanning trees. The shared spanning tree protocol thereby significantly improves the operating efficiency of computer networks, especially those having many VLAN designations.

Moving a VLAN from One Shared Spanning Tree to Another

The SSTP also prevents the formation of temporary loops when secondary VLANs are moved from one primary VLAN to another or primary VLANs are deleted. For example, the violet secondary VLAN which was originally associated with the green primary VLAN may be "moved" to the red primary VLAN. To move a secondary VLAN, the network administrator preferably enters the change at the new root switch. That is, the network administrator records the new association of the violet secondary VLAN with the red primary VLAN at the root of the red shared spanning tree (i.e., switch 112). Similarly, the administrator removes the association of the violet secondary VLAN from the green primary VLAN at root 119.

In response to this re-configuration, root 112 immediately begins transmitting SST-PDUs 300 to propagate the new association to the other switches. More specifically, root 112 formulates SST-PDUs 300 by loading VLAN tag and VLAN ID fields with the red VLAN designation and entering the blue and violet secondary VLANs in the secondary VLAN list 322. Since the list of secondary VLANs has changed (e.g., the violet secondary VLAN has been added), root 112 utilizes a new value in the revision field 324 so that receiving switches will know that a change has taken place.

The revised SST-PDUs 300 are first received at the neighboring switches which examine the VLAN ID and revision fields 318, 324. Since the value contained in revision field 324 has changed the receiving switches examine the contents of the secondary VLAN list 322. The information from the secondary VLAN list 322 is then stored in the neighboring switches' association tables 244. More specifically, the receiving switches locate the entry corresponding to the blue VLAN. Since the SST ID associated with this entry is the same as that carried by the SST-PDU 300, engine 240 simply updates the value in the corresponding Timer 1 cell with the value from the SST-PDU lifetime field 320. The receiving switch next looks up table 244 for the entry corresponding to the violet VLAN.

Here, the only SST ID which is set indicates that green VLAN is the shared spanning tree corresponding to this secondary VLAN, assuming the timer associated with this SST ID has not yet expired. Accordingly, the receiving switch adds the new information without discarding the current information. That is, assuming the green VLAN ID is stored in the SST ID1 cell, the red VLAN designation is entered into the SST ID2 cell and the value from the SST-PDU lifetime field 320 is entered into the Timer 2 cell. Since the violet secondary VLAN is now associated with two shared spanning trees (those identified by the green and red VLAN designations), the corresponding associated cell is set to null. If the new information in a received SST-PDU 300 is different than the current information in both the ID1 and ID2 cells, then the older of the two entries is preferably overwritten with the new information.

The receiving switch then forwards the SST-PDU out all trunk ports associated with the red VLAN designation that are in the learning or forwarding states. As a result, for some period of time, the association tables 244 of all the switches will reflect that the violet VLAN is associated with both the red and green shared spanning trees. Nonetheless, since root 119 no longer associates the violet VLAN with the green primary VLAN, subsequent SST-PDUs formulated by root 119 do not include the violet VLAN designation in the secondary VLAN list 322. As a result, the timer associated with the green VLAN ID stored in the SST ID2 cell is not updated and eventually will expire causing engine 240 to discard the green VLAN ID stored in the SST ID2 cell. Once this entry is discarded, the only shared spanning tree associated with the violet VLAN will be the red VLAN. At this point, the violet VLAN will once again be associated with a single shared spanning tree.

Prior to expiration of the timer and the discarding of the old association, however, switches have conflicting information with regard to the forwarding of data messages tagged with the violet VLAN designation. To prevent the formation of temporary loops during this period, switches preferably suspend the transmission of messages tagged with the violet VLAN designation.

Figures 4A, 4B:
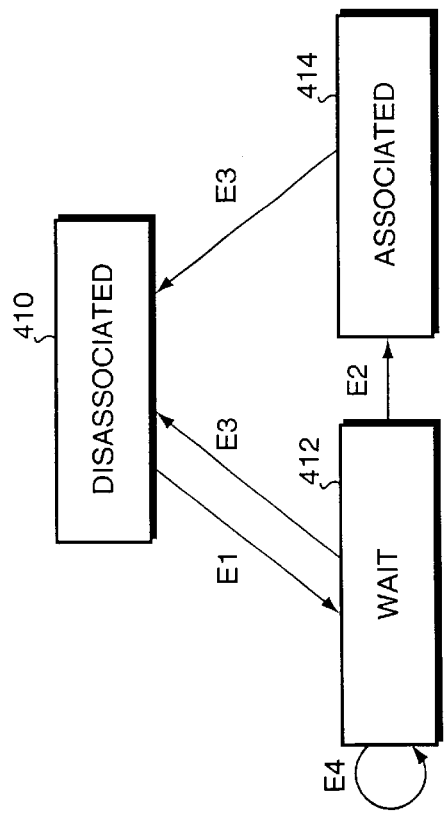
FIG. 4A is a state diagram in accordance with the present invention.
FIG. 4B is an event table in accordance with the present invention.

More specifically, in response to receiving SST-PDUs 300 and examining the contents thereof, the VLAN designations associated with the ports 232 (FIG. 2) of each switch preferably transition among a plurality of states. FIG. 4A is a diagram of the various states that may be entered by the VLAN designations and FIG. 4B is an event table illustrating a plurality of events E1–E4 corresponding to those states. The states preferably include a disassociated state 410, a wait state 412 and an associated state 414. Upon initialization of the corresponding switch 230, each VLAN designation associated with the ports of the switch "hibernates" in the disassociated state 410 and the switch is prevented from forwarding any tagged data messages.

As SST-PDUs 300 are received and their contents examined and stored, the individual VLAN designations associated with the ports of the switch transition among the other states. More specifically, upon receipt of an SST-PDU 300, the corresponding shared spanning tree engine 240 modifies the information in the association table 244, as described above. If, for a given VLAN designation, the corresponding entry in the association table 244 indicates that the VLAN is associated with a single shared spanning tree, the VLAN designation transitions to the wait state 412 for that switch. In the wait state 412, all ports associated with the given VLAN designation are still blocked from forwarding messages tagged with the given VLAN designation, regardless of the port state as defined by the spanning tree algorithm. The purpose of the wait state 412 is to ensure that the new association of the given VLAN to a single shared spanning tree is learned by all neighbor switches in the network before messages are forwarded.

A VLAN designation preferably remains in the wait state 412 until a pre-selected number of SST-PDUs have been sent since entering the wait state 412. This number may be set during the pre-configuration process and preferably equals the number of SST-PDUs which must be sent to ensure receipt by all neighbor switches. If, during this time, an SST-PDU is received indicating that the VLAN designation at issue is also associated with some other shared spanning tree (i.e., the VLAN designation is associated with more than one shared spanning tree), event E3 is triggered and the VLAN designation preferably transitions back to the disassociated state 410. If the requisite number of SST-PDUs 300 are sent (event E2) and no conflicting information is received, the VLAN designation preferably transitions to the associated state 414. In the associated state 414, the VLAN designation is associated with a single shared spanning tree and the switch is permitted to forward messages tagged with this VLAN designation.

From the associated state 414, a VLAN designation transitions back to the disassociated state 410 upon receipt of an SST-PDU 300 indicating that the VLAN is associated with either no shared spanning tree or more than one shared spanning tree (event E3). Again, in the disassociated state 410, the switch is precluded from forwarding messages tagged with this VLAN designation out any port.

In sum, for messages tagged with a given VLAN designation to be forwarded out a given port, two requirements must be met. First, the VLAN designation must be in the associated state 414 at that switch, thereby assuring that the VLAN designation is associated with a single shared spanning tree. Second, the port itself must be in the forwarding state as defined by the spanning tree algorithm, running for the primary VLAN corresponding to the VLAN designation of the message.

Consistency Checking of Native VLANs

Figure 5:
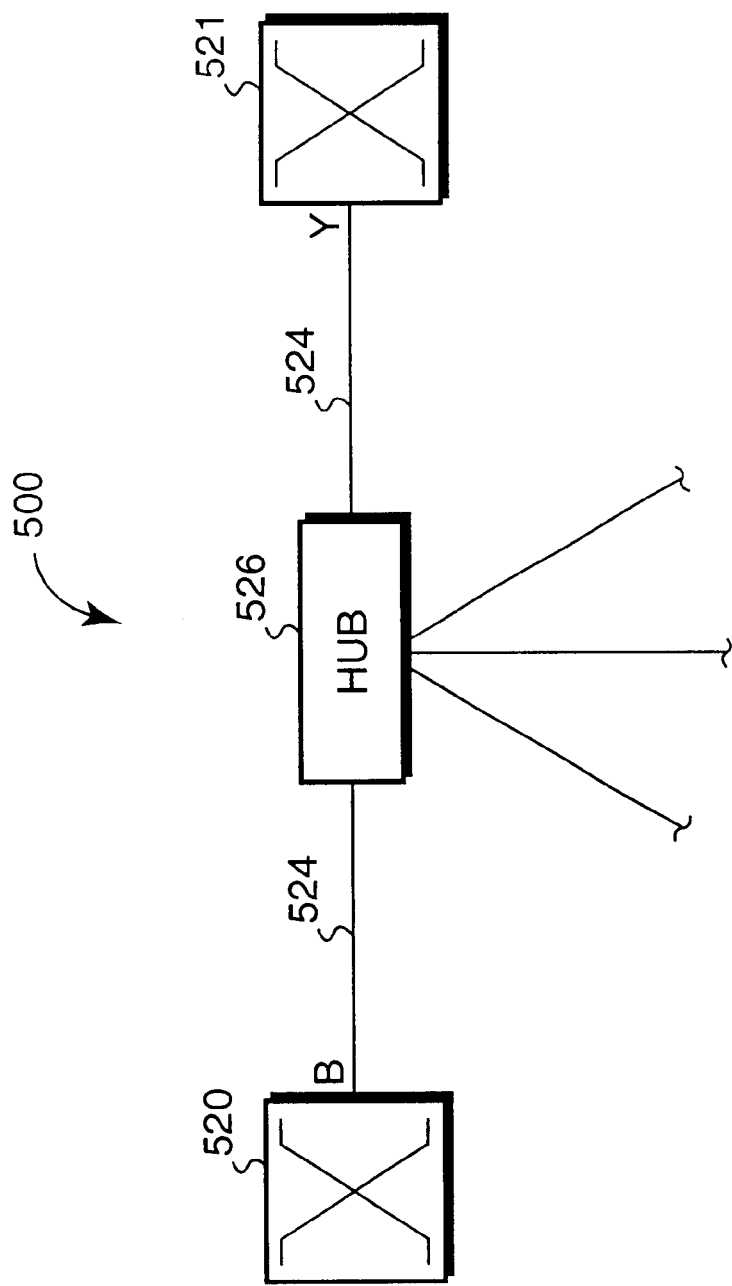
FIG. 5 is a highly schematic block diagram of a segment of a computer network.

In addition to associating secondary VLANs with primary VLANs, SST-PDUs 300 may also be used to confirm that "native" VLANs have been properly configured in each link 126. A native VLAN refers to the VLAN designation associated with all untagged messages traversing a given link connecting two or more devices (e.g., switches). FIG. 5 illustrates a portion of a network 500 including two switches 520, 521 coupled by link 524. Disposed on link 524 is a hub 526 which may be connected to other devices or entities (not shown).

VLAN tagged messages may be exchanged by switches 520, 521. Although the other entities and devices on link 524 may not support the reception or transmission of such tagged messages, it may nonetheless be desirable to associate these other devices with one VLAN designation. Accordingly, switches 520, 521 are preferably configured to associate all untagged messages received from link 524 with a given VLAN designation (i.e., a "native" VLAN). That is, upon receipt of a message generated by a device or entity on link 524 at either switch 520 or 521, the message is tagged with the native VLAN designation and forwarded to the network 500. Similarly, native VLAN-tagged messages intended for a device or entity on link 524 are received by switch 520 or 521. The switches 520, 521 strip off the native VLAN tag and forward the now un-tagged messages onto link 524.

If, however, the native VLAN designation associated with link 524 at switch 520 does not match the native VLAN designation associated with link 524 at switch 521, a loop may result causing serious traffic problems on the network 500. For example, assume switch 520 associates the blue VLAN designation as the native VLAN for link, whereas switch 521 associates the yellow VLAN designation as the native VLAN for link 524. The resulting inconsistency could cause messages to loop indefinitely. Such an inconsistency, however, would be detected by the SSTP and the affected ports disabled.

As described above, roots formulate and transmit SST-PDUs 300 (FIG. 3) in which the primary VLAN designation corresponding to the shared spanning tree assigned to the root is loaded into the VLAN tag and VLAN ID fields 304, 318. In order to detect inconsistent native VLAN configurations, roots also formulate and transmit SST-PDUs tagged with secondary VLAN designations. More specifically, roots formulate SST-PDUs 300 having a given secondary VLAN designation loaded into both the VLAN tag and VLAN ID fields 304, 318. Since a secondary VLAN does not, by definition, have its own secondary VLANs, the secondary VLAN list 322 of such SST-PDUs 300 is empty. That is, the value entered into the list size field 326 is zero. These SST-PDUs 300 propagate throughout the network 100 (FIG. 1) as described above and are utilized by receiving switches to check the consistency of any native VLANs.

More specifically, such SST-PDUs are received by switches 520, 521 and transmitted across link 524. Assume switch 520 receives an SST-PDU which is tagged with the blue VLAN designation and, as a result, carries the blue VLAN designation in field 318. Since switch 520 understands the blue VLAN to be the native VLAN for link 524, switch 520 strips off the VLAN tag field 304. The untagged SST-PDU 300 is then received at switch 521, which examines its contents. Switch 521 determines that the blue VLAN designation was loaded into the VLAN ID field 318 of the SST-PDU. According to switch 521, however, the native VLAN for link 524 is the yellow VLAN designation. That is, switch 521 would only expect to receive untagged SST-PDUs having the yellow VLAN loaded into field 318. Switch 521 thus detects an inconsistency in the configuration of the native VLAN associated with link 524. In response, switch 521 preferably transmits a consistency error message to the network administrator. Furthermore, if the two VLAN designations are associated with different shared spanning trees, the switch 521 preferably disables the affected port to avoid the formation of any loops.

Similarly, switch 520 may receive an untagged SST-PDU 300 from switch 521 across link 524. The VLAN ID field 318 of this untagged SST-PDU 300 will carry the yellow VLAN designation, since switch 521 associates link 524 with the yellow VLAN designation. Nonetheless, switch 520 associates link 524 with the blue VLAN designation. Accordingly, switch 520 also detects the inconsistency and, in response, alerts the network administrator and, if the VLANs are associated with different shared spanning trees, disables the port.

Compatibility of SST-Enabled Switches with Prior Art Switches

Figure 6:
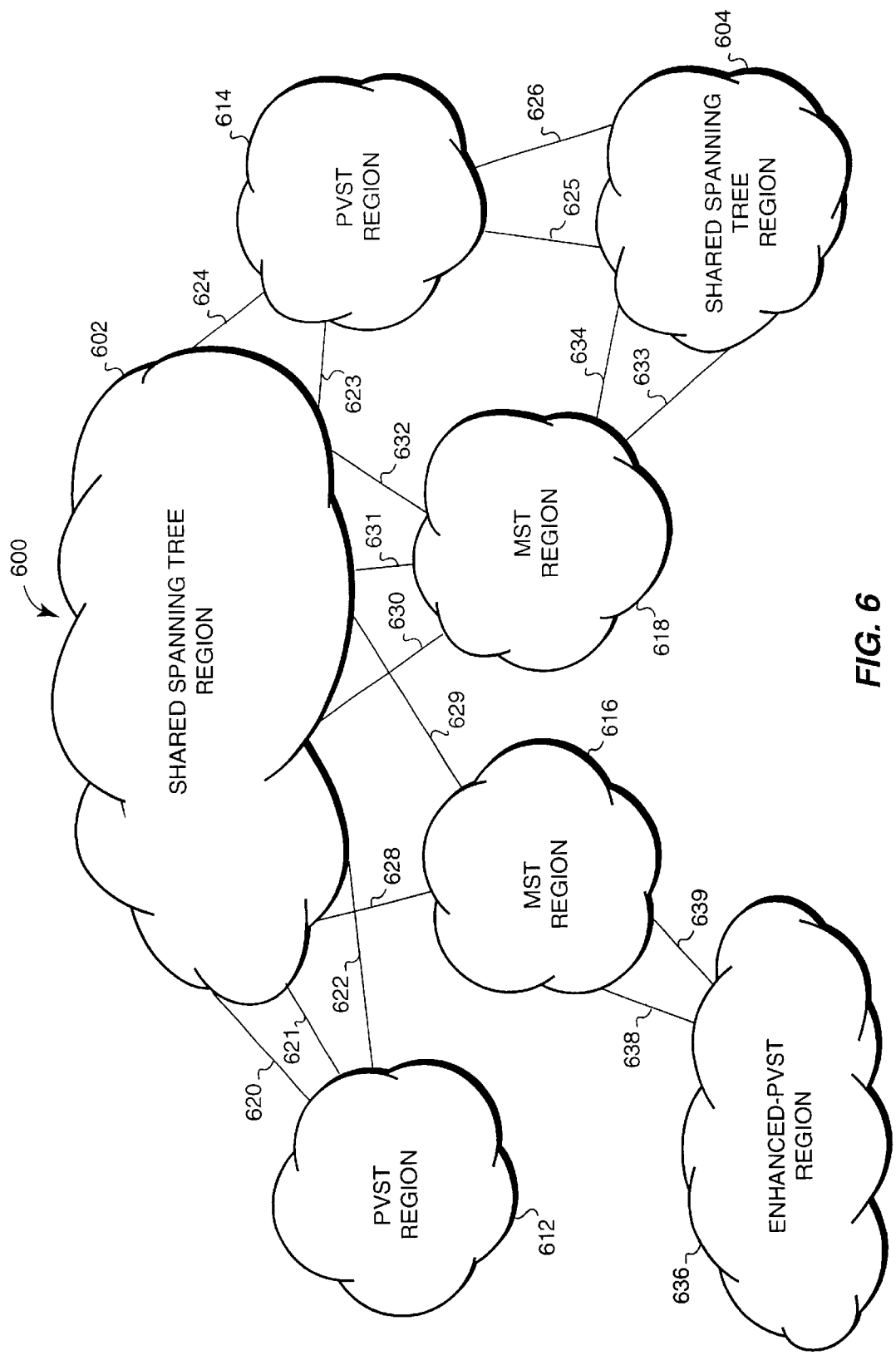
FIG. 6 is a highly schematic diagram of a computer network in accordance with another aspect of the invention.

Some network implementations may include devices, such as switches, bridges, hubs, etc. which do not execute the shared spanning tree protocol. That is, a network may include a plurality of switches configured to calculate a single spanning tree, regardless of the number of VLAN designations. This network may further include a plurality of switches configured to calculate a separate spanning tree for each VLAN designation. FIG. 6 is a highly schematic representation of a network 600 including a plurality of regions each comprising a homogeneous set of switches or devices. More specifically, network 600 includes two shared spanning tree (SST) regions 602, 604 each including a plurality of switches (not shown) configured to run the SST protocol, as described above. The network 600 further includes two regions 612, 614 each having a plurality of switches (not shown) configured to calculate a separate spanning tree for each VLAN designation defined within the respective regions 612, 614 (i.e., per-VLAN spanning tree (PVST) regions). Two other regions 616, 618 include a plurality of switches (not shown) configured to calculate a single spanning tree, regardless of the number of VLAN designations defined within the respective regions 616, 618 (i.e., mono-spanning tree (MST) regions).

Each PVST region 612, 614 is preferably coupled to one or both of the SST regions 602, 604 by a plurality of links 620–626. Similarly, each MST region 616, 618 is coupled to one or both of the SST regions 602, 604 by a plurality of links 628–634. To prevent the isolation of any given region should any given link fail, each PVST and MST region 612–618 preferably has multiple connections to the SST regions 602, 604. The use of multiple (i.e., redundant) links, however, may result in the existence of circuitous paths or loops at the boundaries between the various regions.

In addition, one or more VLAN designations (e.g., red) may be defined in each of the regions of network 600. Since data messages tagged with such a VLAN designation may need to travel across several regions (e.g., from PVST region 612 to SST region 604 via regions 602 and 618), the active topology or spanning tree along which the tagged messages travel both within each region and across the boundaries between regions must therefore be established.

The shared spanning tree protocol ensures that a contiguous active topology or spanning tree is defined across the boundaries of dissimilar regions so as to permit the forwarding of data messages throughout the network 600 while preventing the formation of loops. This is preferably achieved through the formulation, transmission, receipt and processing of novel BPDUs by SST-enabled switches at the boundaries with other regions.

PVST/SST Boundary

Consider the boundaries between the SST regions 602, 604 and the PVST regions 612, 614. In the PVST regions 612, 614, devices, such as switches, formulate, transmit and process BPDUs tagged with each of the VLAN designations defined in those regions 612, 614. These tagged BPDUs will traverse links 620–626 and enter the SST regions 602, 604. In the SST regions 602, 604, the manner in which these BPDUs are processed, pursuant to SSTP, depends on whether the particular VLAN tag of the BPDU corresponds to a primary or secondary VLAN designation.

More specifically, the tagged BPDU is captured by the corresponding frame reception object 236 (FIG. 2) at the SST-enabled switch at the boundary with the PVST region 612 or 614 and the VLAN tag field 342 (FIG. 3) examined. If the VLAN designation contained therein corresponds to a primary VLAN, the BPDU is preferably "mapped" to the corresponding primary VLAN in the SST regions 602, 604. That is, the BPDU is passed to the spanning tree state machine engine 242 (FIG. 2) associated with this VLAN designation at the boundary switch. If the root ID contained in field 352 of the received BPDU is "better" than the root ID currently known by the boundary switch, subsequent BPDUs formulated and transmitted by engine 242 utilize the new root ID and cost field 356 is up-dated.

SST-enabled switches at the boundaries with the PVST regions 612, 614 similarly formulate and transmit BPDUs tagged with primary VLAN designations for receipt within the PVST regions 612, 614. These SST-switch generated BPDUs are processed by the switches in the PVST regions so that loops between the two regions may be identified and blocked. Accordingly, for each primary VLAN designation (e.g., red) that exists in the SST and PVST regions 602, 604, 612 and 614, a single root (preferably in the SST region) is identified and a single active topology or spanning tree is defined. Messages tagged with this primary VLAN designation are forwarded between the SST and PVST regions along this spanning tree which, in the SST region(s), represents a shared spanning tree.

If the VLAN tag of the received BPDU in the SST regions 602, 604 corresponds to a secondary VLAN designation, the BPDU is preferably "tunneled" through the SST regions 602, 604. That is, the BPDU is passed along untouched by the SST-enabled switches. Since the SST regions 602, 604 do not define separate spanning trees for secondary VLAN designations, SST-enabled switches are not interested in the contents of BPDUs tagged with secondary VLAN designations. Nonetheless, since a loop may exist in the interconnections between the SST and PVST regions along secondary VLANs, these BPDUs need to be returned to the PVST region so that any such loops may be identified and blocked through the execution of the spanning tree algorithm. Accordingly, such BPDUs should not be discarded upon receipt in the SST region(s).

Instead, BPDUs tagged with a secondary VLAN designation and received at an SST region 602, 604 are flooded throughout the SST region. In particular, the BPDU is forwarded within the SST region 602, 604 along the shared spanning tree to which the secondary VLAN is associated. That is, if the BPDU is tagged with the blue secondary VLAN designation and blue is associated with the red primary VLAN designation, then the blue tagged BPDU is forwarded along the red shared spanning tree in the SST region 602, 604. If a second connection links the SST region 602, 604 with the PVST region 612, 614, the BPDU will eventually be returned to the PVST region 612, 614 across this second link where it is examined to identify the existence of a loop.

The SST-enabled switches, moreover, neither examine or modify any of the information in the BPDU tagged with a secondary VLAN, such as the root ID, bridge ID or cost. Thus, from the point of view of the PVST regions 612, 614, the SST regions 602,604 each appear as a single broadcast bus and the "root" for such secondary VLAN designations will be in the PVST region. Messages tagged with a secondary VLAN designation and received at the SST regions 602, 604 are similarly forwarded, as necessary, along the shared spanning tree associated with the secondary VLAN designation appended to the messages.

It should be understood that if a BPDU is received at the SST regions 602, 604 and it is tagged with a VLAN designation that is not defined those regions, the BPDU is discarded.

MST/SST Boundary

As described above, certain prior art switches and switches strictly conforming to the IEEE 802.1Q standard are limited to defining a single spanning tree, regardless of the number of VLAN designations established within the network. These switches typically exchange and process untagged BPDUs. Accordingly, at the boundary between MST and SST regions, untagged BPDUs may be received by SST-enabled switches of regions 602, 604. Here, the SST-enabled switches are preferably pre-configured to "map" the untagged BPDUs to a common spanning tree, i.e., a single shared spanning tree existing within the SST regions 602, 604. Although the common spanning tree may be any shared spanning tree in the SST regions 602, 604, for purposes of consistency, it is preferably the shared spanning tree having the lowest numeric VLAN identifier. That is, SST-enabled switches utilize the primary VLAN with the lowest numeric ID as the common spanning tree.

Upon receipt of the untagged BPDUs, the SST-enabled switches examine the information loaded into the root and bridge ID fields 352, 354 and the cost field 356. This information is then utilized by the spanning tree engine 242 at the SST-enabled switch in formulating subsequent BPDUs which, if sent in the SST regions 602, 604, are tagged with the primary VLAN designation corresponding to the common spanning tree. If the BPDUs are being sent from the SST regions 602, 604 to the MST regions 616, 618, the BPDUs are not tagged with the primary VLAN designation of the common spanning tree, since tagged BPDUs are discarded in the MST regions 616, 618 as unrecognized.

To the extent two SST regions 602, 604 are separated by an MST region 618, BPDUs tagged with primary VLAN designations other than the primary VLAN designation corresponding to the common spanning tree may need to be passed through the intervening MST region 618. This would be necessary since the root of a primary VLAN existing in the two separated SST regions 602, 604 will only exist in one of them.

The shared spanning tree protocol preferably achieves this goal by formulating and transmitting tagged BPDUs with a novel destination address loaded into field 344. As mentioned above, conventional BPDUs are loaded with a multicast destination address defined by the IEEE 802.1D standard. Accordingly, switches operating in accordance with the 802.1D standard recognize such messages as BPDUs. A BPDU tagged with a VLAN designation but loaded with the 802.1D address would be recognized by an MST switch as a BPDU having an incorrect format and thus be discarded. To avoid this problem, SSTP utilizes a new multicast address in the destination address field 344 which is distinguishable from the destination address defined by the 802.1D standard.

Upon receiving tagged BPDUs containing with this new destination address, MST switches do not recognize the messages as BPDUs at all. Instead, MST switches simply consider the tagged BPDUs to be data messages carrying some new multicast address. That is, the novel address is preferably in the form of a multicast address. In response, the switches in the MST region 618 simply flood the tagged "BPDUs". Furthermore, since they are not recognized as BPDUs, the MST switches do not examine or modify the contents of the BPDUs such as the root ID fields 352. These BPDUs are eventually forwarded to the second SST region 604 or back to the first SST region 602 on a second connection where they are captured by the SST-enabled switches 230 and examined by the corresponding spanning tree engines 242 which are pre-configured to recognize this new multicast destination address as a BPDU. Therefore, by running SSTP, SST regions 602, 604 can define the same shared spanning trees despite being separated by an MST region 618.

As described above, the shared spanning tree protocol is thus compatible with devices not running the protocol and can define contiguous active topologies in networks having dissimilar devices.

In addition, rather than implementing all aspects of the shared spanning tree protocol, one or more devices may be configured to utilize only a portion of the protocol's functionality. For example, a PVST switch may be enhanced to utilize the interoperability aspects of SSTP, while still defining a separate spanning tree for each VLAN designation. Such an enhanced-PVST switch would be similar to switch 230 (FIG. 2) absent the shared spanning tree state machine engine 240 and table 244, since secondary VLANs would not be supported. Nonetheless, as described below, the enhanced-PVST switch would be configured to interoperate with other switches.

Referring again to FIG. 6, network 600 may include an enhanced-PVST region 636 that preferably contains enhanced-PVST switches (not shown). The enhanced-PVST region 636, moreover, may be coupled to an MST region, such as MST region 616, by links 638, 639.

The enhanced-PVST switches are preferably configured to map untagged BPDUs originating from MST region 616 and received at the enhanced-PVST region 636 to a common spanning tree within the enhanced-PVST region 636 as described above. That is, the enhanced-PVST switches are similarly configured to utilize the VLAN designation with the lowest numeric identifier as the common spanning tree for purposes of mapping the single spanning tree defined within the MST region 616 to a single spanning tree in the enhanced-PVST region 636. Additionally, BPDUs generated in the enhanced-PVST region 636 that correspond to the common spanning tree but are transmitted to MST region 616 are preferably untagged so that they may be recognized and processed by the MST switches of region 616.

To transmit BPDUs to MST region 616 that correspond to VLAN designations other than the common spanning tree, enhanced-PVST switches are preferably configured to recognize and use the new multicast destination address described above. That is, enhanced-PVST switches formulate tagged BPDUs loaded with the new multicast address for transmission to MST region 616. As described above, such tagged BPDUs are tunneled through the MST region 616 untouched by the MST switches.

As shown, enhanced-PVST region 636 is compatible with MST regions 616, 618. It should be understood that the enhanced-PVST region 636 may also be directly connected to a PVST region, such as region 612, and/or an SST region, such as region 602. That is, enhanced-PVST switches are also interoperable with both PVST switches and SST-enabled switches, even though the enhanced-PVST region 636 still defines a separate spanning tree for each VLAN designation.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. In a network device having a plurality of ports each associated with zero, one or more virtual local area network (VLAN) designations that are classified as either primary or secondary VLANs, a method for transitioning the ports among a plurality of spanning tree port states including a blocking state and a forwarding state, the method comprising the steps of:

generating bridge protocol data units (BPDUs) one or more of which are tagged with a given primary VLAN designation;

forwarding the tagged BPDUs from at least one port;

transitioning at least one port to the forwarding state for the given primary VLAN designation; and associating at least one secondary VLAN with the given primary VLAN.

2. The method of claim 1 further comprising the step of forwarding a network message tagged with a primary VLAN designation from a port in the forwarding state for the primary VLAN.

3. The method of claim 2 further comprising the steps of:

for a network message tagged with a given secondary VLAN designation, determining which primary VLAN designation or designations are associated with the given secondary VLAN designation; and if the given secondary VLAN designation is associated with only one primary VLAN designation, forwarding the network message from a port in the forwarding state for the primary VLAN.

4. The method of claim 3 further comprising the steps of:

generating one or more shared spanning tree protocol data units (SST-PDUs), the SST-PDUs tagged with a VLAN designation and, if the VLAN designation with which the SST-PDU is tagged is a primary VLAN to which one or more secondary VLANs are associated, including in the SST-PDU information identifying at least one of the secondary VLANs associated with the primary VLAN with which the SST-PDU is tagged; and forwarding the SST-PDU from at least one port.

5. The method of claim 4 wherein the network device has an association table having an entry for each VLAN designation and wherein the method further comprises the step of entering, at the association table, for each secondary VLAN designation, an identifier for the primary VLAN to which the respective secondary VLAN designation is associated.

6. The method of claim 5 wherein the step of generating SST-PDUs comprises the steps of:
 loading the SST-PDU with at least one secondary VLAN designation; and
 tagging the SST-PDU with a primary VLAN designation, provided that the primary VLAN designation is not a native VLAN.

7. The method of claim 6 further comprising the step of establishing at least one association table at the network device for mapping secondary VLAN designations to their corresponding primary VLAN designations.

8. The method of claim 7 wherein the association table includes an entry for each secondary VLAN designation.

9. The method of claim 8 further comprising the step of, in response to receiving an SST-PDU tagged with a given primary VLAN designation and loaded with one or more secondary VLAN designations, entering, at the respective entries of the association table for the one or more secondary VLAN designations, the primary VLAN designation with which the received SST-PDU is tagged.

10. The method of claim 9 further comprising the steps of, in response to the step of entering the primary VLAN designation for a given secondary VLAN designation in the association table:
 setting a timer corresponding to that entry;
 resetting the respective timer upon receiving a subsequent SST-PDU that similarly associates the given secondary VLAN designation with the primary VLAN designation previously stored at that entry; and
 discarding the entry upon expiration of the respective timer.

11. A network device for use in a computer network having a plurality of virtual local area network (VLAN) designations, at least some of the VLAN designations being classified as either a primary VLAN designation or as a secondary VLAN designation wherein each secondary VLAN designation is associated with zero, one or more than one primary VLAN designations, the network device comprising:
 means for receiving and sending messages from the network device;
 means, coupled to the receiving and sending means, for generating and sending bridge protocol data units (BPDUs) tagged with a primary VLAN designation;
 means, coupled to the receiving and sending means, for generating and sending shared spanning tree protocol data units (SST-PDUs) tagged with a VLAN designation and, where the VLAN tag of the SST-PDU corresponds to a primary VLAN to which one or more secondary VLANs are associated, the SST-PDU configured to contain at least one associated secondary VLAN designation; and
 means for associating secondary VLAN designations contained in received SST-PDUs with the primary VLAN designation with which the respective SST-PDUs are tagged.

12. The network device of claim 11 wherein a received message tagged with a given secondary VLAN designation is forwarded from one or more of the receiving and sending means that are in a forwarding state for the primary VLAN designation to which the secondary VLAN designation of the message is associated, provided that the secondary VLAN designation is associated with only one primary VLAN designation.

13. The network device of claim 12 further comprising means for transitioning one or more secondary VLAN designations among a plurality of shared spanning tree states including a disassociated state, a wait state and an associated state.

14. The network device of claim 13 wherein a secondary VLAN designation is transitioned to the associated state when it is associated with only one primary VLAN designation.

15. The network device of claim 14 wherein a secondary VLAN designation is transitioned to the disassociated state when it is associated with zero or more than one primary VLAN designations.

16. The network device of claim 15 wherein the tagged BPDUs include a destination address field, the network device further comprising means for entering a non-standard value into the destination address field of tagged BPDUs so as to distinguish the tagged BPDUs from BPDUs compatible with the IEEE 802.10bridge specification standard.

17. The network device of claim 11 wherein the SST-PDU generating and sending means generates an SST-PDU comprising:
 a first field containing a given primary VLAN designation; and
 a second field containing at least one secondary VLAN designation associated with the primary VLAN designation contained in the first field.

18. The network device of claim 17 wherein the second field contains one or more sub-fields which identify all of the secondary VLAN designations associated with the primary VLAN designation contained in the first field.

19. The network device of claim 18 wherein the second field comprises:
 a first sub-field containing a list of all secondary VLAN designations associated with the primary VLAN designation contained in the first field;
 a second sub-field identifying the first secondary VLAN designation contained in the first sub-field; and
 a third sub-field containing a value corresponding to the size of the first sub-field.

20. The network device of claim 17 wherein the SST-PDU further comprises a third field containing a time-out value for aging out information contained in the SST-PDU.

* * * * *